(12) United States Patent
Hansen

(10) Patent No.: US 11,823,314 B2
(45) Date of Patent: Nov. 21, 2023

(54) SYSTEM AND METHOD FOR MANIPULATING A DISPLAY OF A VIRTUAL MULTI-DESK ENVIRONMENT

(71) Applicant: Thinklogical LLC, Milford, CT (US)

(72) Inventor: Peter Alexander Hansen, Sausalito, CA (US)

(73) Assignee: THINKLOGICAL, LLC, Milford, CT (US)

( * ) Notice: Subject to any disclaimer, the term of this patent is extended or adjusted under 35 U.S.C. 154(b) by 51 days.

(21) Appl. No.: 17/687,058

(22) Filed: Mar. 4, 2022

(65) Prior Publication Data

US 2022/0284647 A1 Sep. 8, 2022

Related U.S. Application Data

(60) Provisional application No. 63/157,334, filed on Mar. 5, 2021.

(51) Int. Cl.
| | |
|---|---|
| *G06T 11/60* | (2006.01) |
| *G06F 9/451* | (2018.01) |
| *G06T 3/40* | (2006.01) |
| *G06T 11/20* | (2006.01) |

(52) U.S. Cl.
CPC .............. *G06T 11/60* (2013.01); *G06F 9/452* (2018.02); *G06T 3/40* (2013.01); *G06T 11/203* (2013.01); *G06T 2200/24* (2013.01); *G06T 2210/12* (2013.01)

(58) Field of Classification Search
CPC ... G06T 11/203; G06T 11/60; G06T 2200/24; G06T 3/40; G06T 2210/12
See application file for complete search history.

(56) References Cited

U.S. PATENT DOCUMENTS

| | | | |
|---|---|---|---|
| 8,941,658 B2* | 1/2015 | Mankovski | G09G 5/00 345/440 |
| 2015/0378556 A1* | 12/2015 | Ramanathan | G06F 3/04842 715/765 |
| 2016/0125068 A1* | 5/2016 | Dongieux | G06F 16/285 707/740 |
| 2020/0044939 A1* | 2/2020 | Xia | G06F 9/52 |
| 2020/0082037 A1* | 3/2020 | Zhang | G06F 30/33 |
| 2022/0215044 A1* | 7/2022 | Hampton | G06F 16/7335 |
| 2022/0318695 A1* | 10/2022 | Crawshaw | G06Q 50/26 |

* cited by examiner

*Primary Examiner* — Phi Hoang
(74) *Attorney, Agent, or Firm* — Cantor Colburn LLP

(57) ABSTRACT

Disclosed is a method of updating a graphical rendering, in a system display by a system controller, of technology assets operationally connected to the system controller.

4 Claims, 16 Drawing Sheets

SYSTEM AND METHOD FOR MANIPULATING A DISPLAY OF A VIRTUAL MULTI-DESK ENVIRONMENT

CROSS-REFERENCE TO RELATED APPLICATIONS

This application claims the benefit of U.S. Provisional Patent Application No. 63/157,334, filed Mar. 5, 2021, the disclosure of which is incorporated herein by reference in its entirety.

BACKGROUND

Exemplary embodiments pertain to the art of interconnected multi-desk environments and more specifically to a system and method for manipulating a display of a virtual multi-desk environment.

Certain computing environments may include computer stations, each including a keyboard, a video display and a mouse (collectively "KVM"). These computers stations may be in a common room. The common room may include a few (one or more) common displays. The common displays may include large screen displays prominently situated in the common room and suitable for displaying information for simultaneous viewing throughout the common room. Using KVM controls, one of the computer stations may use one of the common displays as a clone or extension of its display.

SUMMARY OF THE EMBODIMENTS

Disclosed is a method of updating a graphical rendering, in a system display by a system controller, of technology assets operationally connected to the system controller.

For example, disclosed is a method of updating a graphical rendering, in a system display by a system controller, of technology assets operationally connected to the system controller, wherein the technology assets are rendered as asset boxes and distributed along a system grid that includes: a first grid at the top or bottom of the system grid in a height-wise direction that includes shared displays; and a second grid that is adjacent to the first grid in the height-wise direction and includes stations that respectively include station assets including station displays and peripheral assets, wherein the first grid is a row-grid extending in a transverse direction and the second grid is a rectangular-grid including rows extending in the transverse direction and columns extending in the height-wise direction; and the method comprising: receiving instructions indicating that ones of the technology assets are selected as active for a computing session; removing from the graphical rendering the technology assets that are not selected, wherein, for the selected technology assets, the method further includes: grouping the assets at the respective stations as station-bounded asset boxes, wherein the station-bounded asset boxes have a combined height-wise and transverse span of each of the asset boxes therein in their then existing positions in the system grid; determining that the first grid includes shared displays and that that remaining assets in the system grid are station assets; defining first and second display bands along the system display, wherein the first display band is height-wise above the second display band, and wherein the first grid is located in the first display band and the second grid is located in the second display band; determining when any one of the rows of the system grid includes two or more of the sets of bounded asset boxes, and grouping the two or more of the sets of bounded asset boxes as row-bounded asset boxes; organizing the sets of bounded asset boxes in the second display band so that height-wise adjacent ones of the sets of bounded asset boxes in the second display band are within a predetermined distance of each other; determining when any one of the columns of the system grid in the second display band includes two or more of the sets of bounded asset boxes, and grouping the two or more of the sets of bounded asset boxes as column-bounded asset boxes; organizing the sets of bounded asset boxes in the second display band so that transversely adjacent ones of the sets of bounded asset boxes in the second display band are within the predetermined distance of each other; grouping the sets of bounded asset boxes in the second display band as a band-bounded asset box, wherein the band-bounded asset box has a combined height-wise and transverse span of each of the sets of bounded asset boxes therein in their then existing positions in the system grid; transversely centering the band bounded assets in the second band and the assets in the first band; scaling the first and second display bands so that the sets of bounded asset boxes therein fit the available space within the respective display bands; and rendering the asset boxes as centered and scaled. Further disclosed is a computer program product comprising a computer readable medium having computer readable program code configured for implementing this method.

Further disclosed is a method of updating a graphical rendering, in a system display by a system controller, of technology assets operationally connected to the system controller, wherein the technology assets are rendered as asset boxes and distributed along a system grid that includes: a first grid at the top or bottom of the system grid in a height-wise direction that includes shared displays; and a second grid that is adjacent to the first grid in the height-wise direction and includes stations that respectively include station assets including station displays and peripheral assets, wherein the first grid is a row-grid extending in a transverse direction and the second grid is a rectangular-grid including rows extending in the transverse direction and columns extending in the height-wise direction; and the method comprising: receiving instructions indicating that ones of the technology assets are selected as active for a computing session; removing from the graphical rendering the technology assets that are not selected, wherein, for the selected technology assets, the method further includes: determining when two or more transversely adjacent ones of the asset boxes are successively spaced apart from each other by a distance that is less than a threshold; grouping the two or more of the asset boxes as transverse-bounded asset boxes; and determining when two or more height-wise adjacent ones of the asset boxes are successively spaced apart from each other by a distance that is less than the threshold; grouping the two or more of the asset boxes as height-wise-bounded asset boxes, thereby grouping, from the assets at the stations, station-bounded asset boxes. Further disclosed is a computer program product comprising a computer readable medium having computer readable program code configured for implementing this method.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
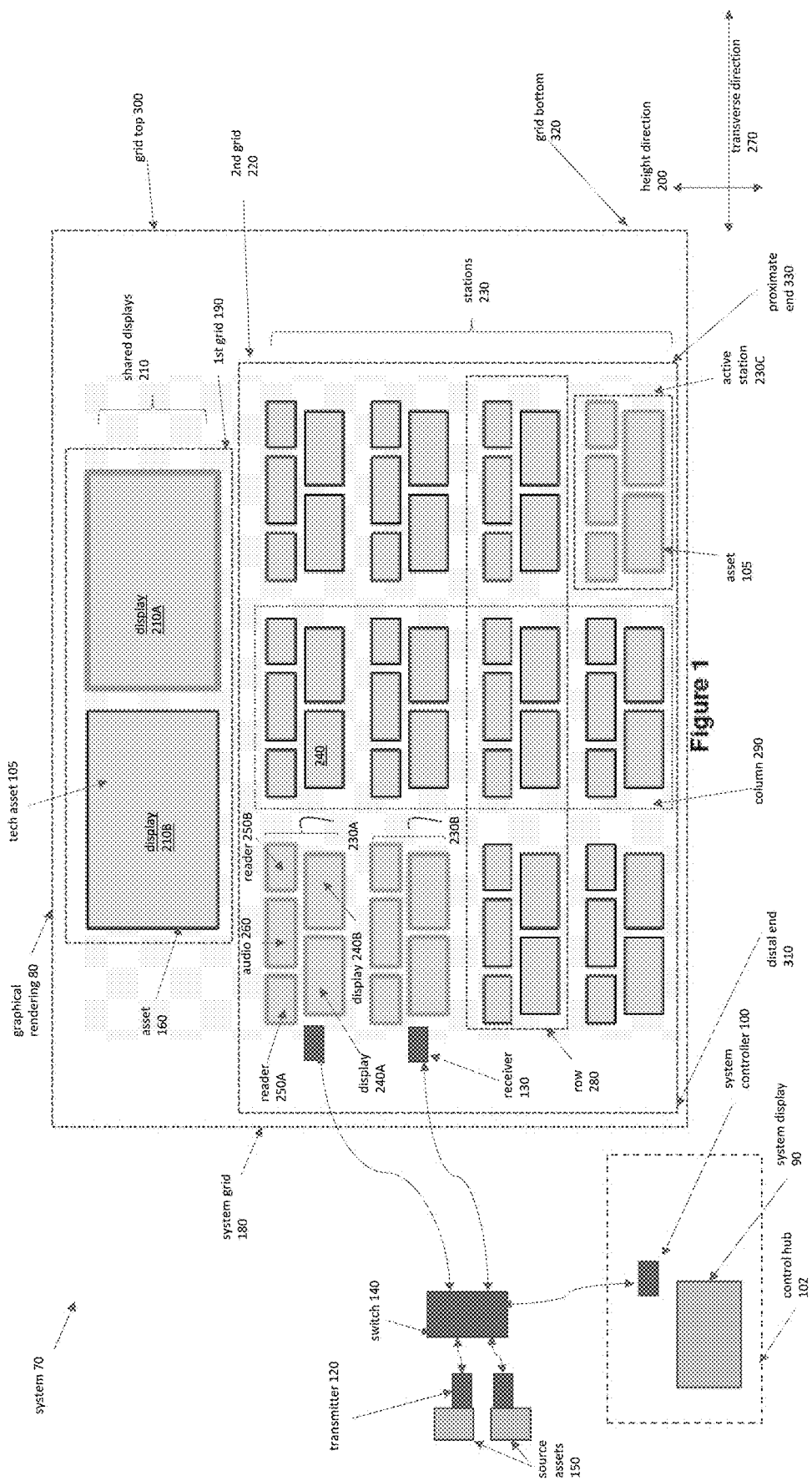
FIG. 1 shows technical features of a switching system and a graphical grid showing technical assets that are controllable by the switching system according to a disclosed embodiment, where the graphical grid is displayed on the system display to enable controlling the technical assets of the switching system.

A detailed description of one or more embodiments of the disclosed apparatus and method are presented herein by way of exemplification and not limitation with reference to the Figures.

The embodiments are directed to an Enhanced Zoom View (EZ View). EZ View is a feature in a graphical user interface, such as a drag and drop utilizing an interface (that is, an HID, i.e., a human interface device). The interface enables users to visualize their actual technology room layouts onscreen (virtually) in a switching (KVM) environment and logically and communicatively connect/couple a source device and a destination device. A source device may typically be a computer workstation, set top box, or other data communication station, that transmits information. A destination device may typically be a keyboard, video and mouse (KVM) and audio, where such implements may receive the transmitted data and utilize the data for logical operations, for example to control the source workstation (with the KVM) or play the data over a destination speaker, etc. The source and destination devices may be coupled by moving their representative icons on the graphical user interface to predefined graphical locations. It is to be appreciated that the devices identified herein may be configured for bi-directional electronic communications even if labeled source or destination devices, as would be appreciated by one of ordinary skill. The EZ View provides an automated enhanced view of the selected destination technology assets, which, as indicated, may be for example displays, monitors, speakers, card readers 250, etc. referred to generally as technology assets. The accompanying diagrams illustrate an EZ View algorithm that provides the user with a visually focused, scaled, and enhanced representation of the selected assets.

More specifically, turning to FIGS. 1-8, a schematic representation of a method, executed by components collectively referred to as a system 70, is disclosed of updating a graphical rendering 80, in a system display 90 by a system controller 100. The display and controller 90, 100 may be located at a system control hub 102, which may be in a same room as or separated from the rest of the technology assets 105 operationally connected to the system controller 100. The system controller 100 may be operationally connected to the technology assets 105 in a switching environment (e.g., environment with technology assets 105 that are subject to the switching).

One or more transmitters 120 may be operationally connected to a respective one or more receivers 130 via a switch 140 operationally controlled by the controller 100. The receivers 130 may be operationally associated with the individual or groupings of technology assets 105, where such groupings are discussed in detail below. The receivers 130, transmitters 120, and switch 140 may be connected via, e.g., fiber optic lines, though other wired or wireless communication channels are within the scope of the disclosure. The transmitters 120 may be operationally connected to one or more source technology assets 150, which may include data input/output devices such as databases, video and audio input/output devices, and other data transmission devices such as satellite dishes. In one embodiment the controller executes the methods identified herein when routing information (video/audio/data, in raw or compiled form) from the source technology assets 150 to a selected one or more of the destination technology assets 160 that are identified as being active for the purpose of processing or otherwise manipulating the same.

The technology assets 105 are graphically distributed along a system grid 180. The system grid 180 includes a first grid 190 (or sub-grid) at the top of the system grid 180 in a height-wise direction 200 that includes shared displays 210 (or screens) including displays 210A, 210B, respectively rendered as asset boxes (or rectangles).

The system grid 180 also includes a second grid 220 (or sub-grid) that is below the first grid 190 in the height-wise direction 200 and includes desktop systems (also referred to as workstations 230, or as stations 230 (including, e.g., individual station 230A) for simplicity). The stations 230 respectively include station displays 240 (including, e.g., station displays 240A, 240B), and may include other peripheral type assets such as access card readers 250 (including readers 250A, 250B) and audio devices 260 (speakers/microphones), rendered as respective asset boxes.

It is to be appreciated that any one of the station displays 240 may be utilized as the system display 90 to thereby engage the system 70, via communicating with the system controller 100, and cause the system controller 100 execute the processes identified herein. That is, in one embodiment, rather than requiring all control operations to be executed in a separate control hub 102, each system display 240 is capable of operating as the system display 70 and engage with the system controller 100 to control the process as disclosed herein.

Though the different asset types are illustrated in different box sizes, such sizing is not intended on limiting the scope of the embodiments. The first grid 190 is a row-grid extending in a transverse direction 270. The second grid 220 is a rectangular-grid including rows 280 extending in the transverse direction 270 and columns 290 extending in the height-wise direction 200. Thus, as shown, the technology assets 105 are organized in a virtual multi-desk environment.

The embodiments will now be disclosed in greater detail with reference to the figures. In sum, FIGS. 1-8 show a schematic representation of a process, executed by a system controller, of organizing computing assets on a system display upon identifying ones of the computing assets as being active in a computing session. FIGS. 9-15 show additional aspects of the process shown in FIGS. 1-8, including organizing desktop system devices on the system display upon identifying the ones of the computing assets as being active in a computing session.

FIG. 1 shows technical features of a switching system and a graphical grid showing technical assets that are controllable by the switching system according to a disclosed embodiment. The graphical grid is displayed on the system display to enable controlling the technical assets of the switching system. As shown in FIG. 1, the method includes the system, via the system controller 100, receiving instructions indicating that ones of the technology assets 105 are selected as active for a computing session, e.g., for collaboration purposes. The active assets include one shared display 210A and three stations 230, including two stations 230A, 230B in the first column (top 300-distal 310, or top-left, side of grid) and a third station 230C in the third column (bottom 320-proximate 330, or bottom-right, side of grid).

Figure 2:
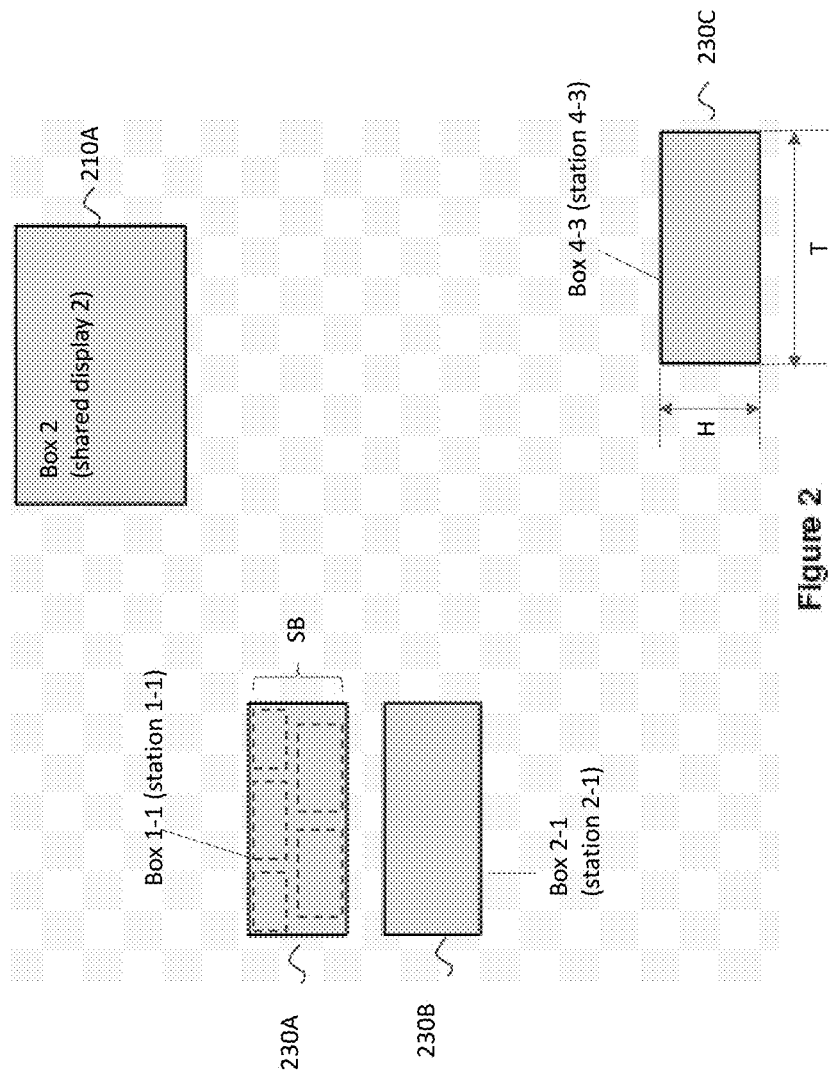
FIG. 2 shows only active set of technical assets in the grid according to one step of the disclosed embodiment, where technical assets on a common station are bounded by station (i.e., station bounded).

FIG. 2 shows only active set of technical assets in the grid according to one step of the disclosed embodiment, where technical assets on a common station are bounded by station (i.e., station bounded). As shown in FIG. 2, the method includes removing from the graphical rendering 80 the technology assets 105 that are not selected. For the selected technology assets 105, the method further includes the system grouping (e.g., in accessible memory, though screen rendering is within the scope of the embodiments) the respective assets as station-bounded asset boxes. The station-bounded asset boxes are spaced apart from each other and the shared displays 210. The assets that are bound at a respective station are shown in hidden lines in FIG. 2. The station-bounded asset boxes have a combined height-wise H and transverse span T of each of the asset boxes therein in their then existing positions in the system grid 180.

In FIG. 2, the shared display, or shared display 2 relative to its grid position, is shown as box 2. The three station assets are respectively shown as box 1-1 for station 1-1, box 2-1 for station 2-1 and box 4-3 for station 4-3, using matrix nomenclature relative to their respective positions in the original grid. Each of the station-bounded asset boxes (e.g., box 1-1) are shown as being smaller than each of the shared asset boxes (e.g., box 2), though this is not intended on limiting the scope of the disclosure. The process of differentiating between shared display assets and station assets, and segregating the station assets among the respective stations 230, is discussed in greater detail below and illustrated in FIGS. 9-16.

Figure 3:
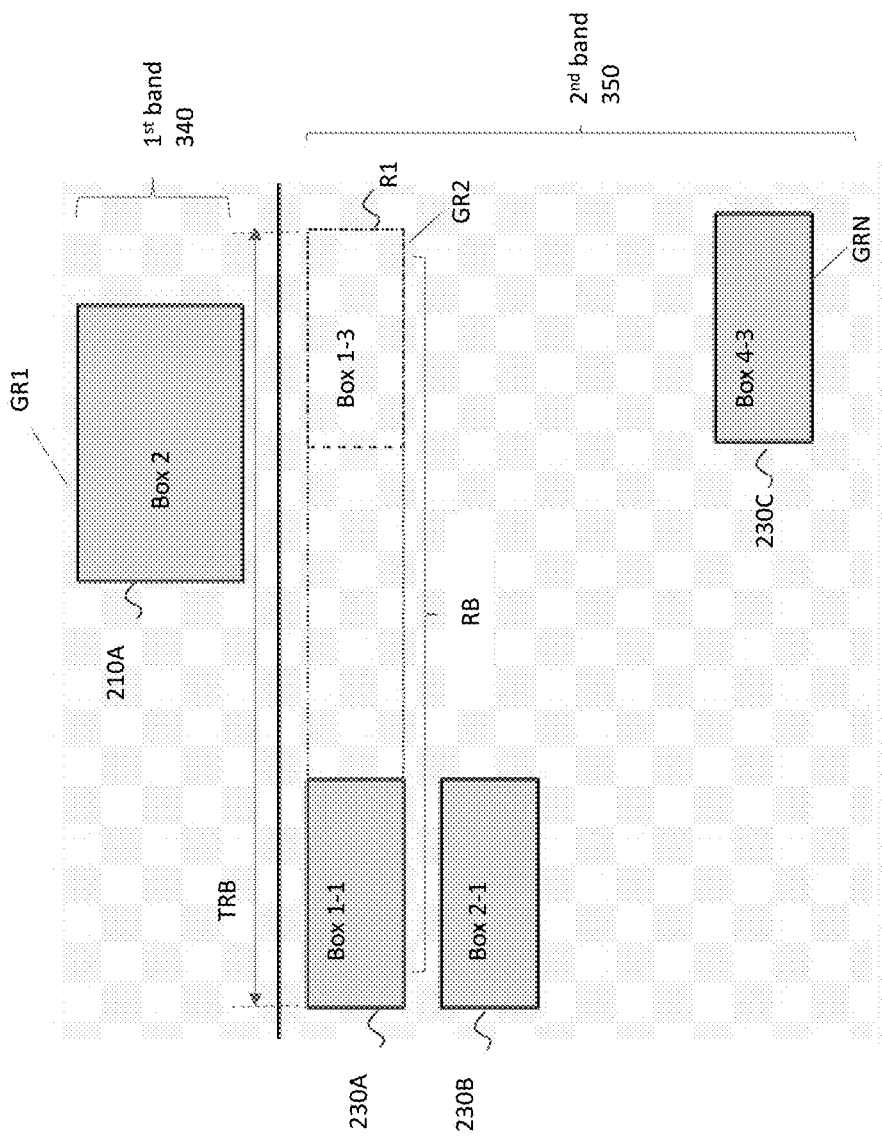
FIG. 3 shows the active set of technical assets in the grid according to another step of the disclosed embodiment, where technical assets on a common row, having been station bounded, are bounded by row (i.e., row bounded).

FIG. 3 shows the active set of technical assets in the grid according to another step of the disclosed embodiment, where technical assets on a common row, having been station bounded, are bounded by row (i.e., row bounded). As shown in FIG. 3, the method includes the system comparing a size of the asset boxes distributed in the first and second rows (including as logically bounded) of the system grid 180 (GR1 and GR2 identify grid rows 1 and 2, respectively). This enables the system to render a determination that the first row GR1 of the system grid 180 is formed by the first grid 190 (FIG. 1) and that the remaining rows GR2, etc., of the system grid 180 are formed by the second grid 220 (FIG. 1). For example, the size of box 2 is compared against the size of box 1-1, e.g., stored in accessible memory, though measuring screen renderings is within the scope of the disclosure. If there is a greater than 20% size different (as one non-limiting ratio), then the system determines that the top row GR1, in which box 2 is located, is a shared asset row. The same determination may be made with respect to the bottom row GRN of asset box 4-3, with a box in the adjacent row, in this case, box 2-1. As these boxes are the same size, the determination is made that the bottom row is not populated with shared assets but instead with stations 230.

The method further includes the system defining first and second display bands 340, 350 along the system display 90. The first display band 340 is height-wise above the second display band 350. The first grid 190 is located in the first display band 340 and the second grid 220 is located in the second display band 350.

The method includes the system determining when any one of the rows of the system grid 180 includes two or more of the sets of bounded asset boxes (e.g., station-bounded). Though only one active station 1-1 is in the top row R1, a second active station 1-3 (based on its location in the grid, applying matrix reference positions) in the top row R1 could be selected in an alternative implementation. In such instance the method includes grouping the two or more of the Sets of bounded asset boxes as row-bounded asset boxes, e.g., a row-bounded asset box is illustrated as RB. The row-bounded asset box RB has a combined transverse-wise span TRB of each of the sets of bounded asset boxes therein in their then existing positions in the system grid 180.

Figure 4:
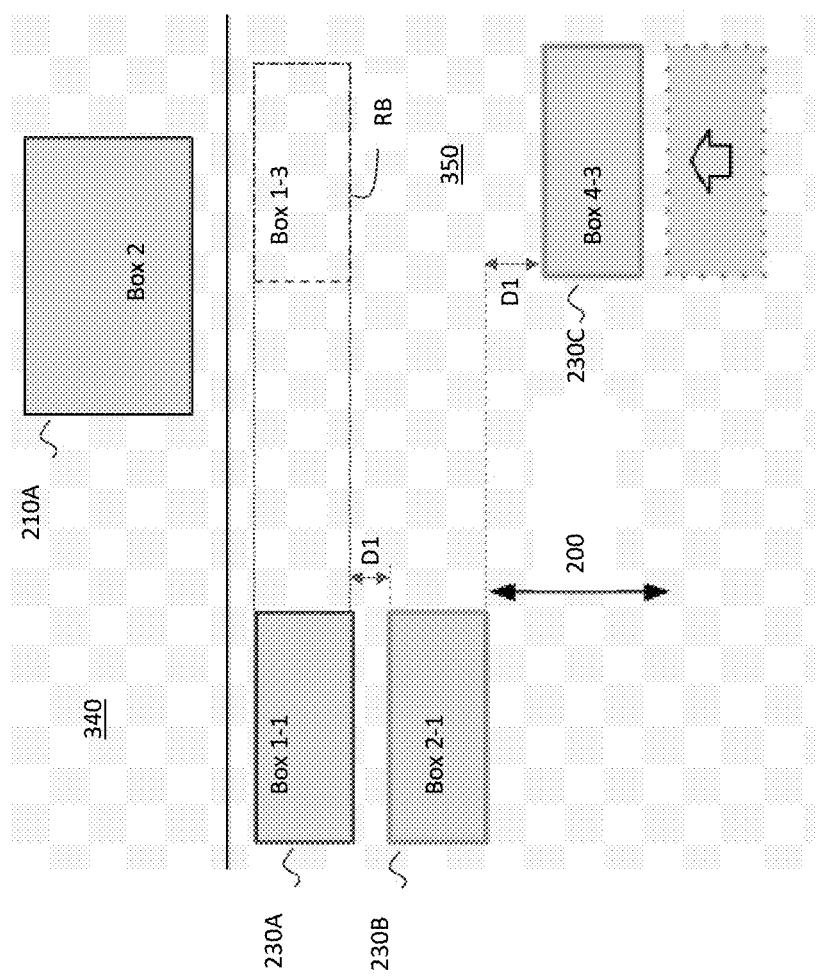
FIG. 4 shows the active set of technical assets in the grid according to another step of the disclosed embodiment, where technical assets, having been station and row bounded, are height-wise adjusted within their respective bands.

FIG. 4 shows the active set of technical assets in the grid according to another step of the disclosed embodiment, where technical assets, having been station and row bounded, are height-wise adjusted within their respective bands. As shown in FIG. 4, the method includes the system organizing the sets of bounded asset boxes (station and row bounded, if any) in the second display band 350 so that height-wise adjacent ones of the sets of bounded asset boxes 1-1, 2-1 and 4-3 in the second display band are within a predetermined distance D1 of each other. The row-bounded asset boxes move as a unit during any height-wise manipulation of the row in this step. Once this manipulation is complete, the boxes 1-1 and 1-3 are ungrouped from each other (e.g., the row bounding is ended) so that further optimization steps may occur, as discussed below.

Figure 5:
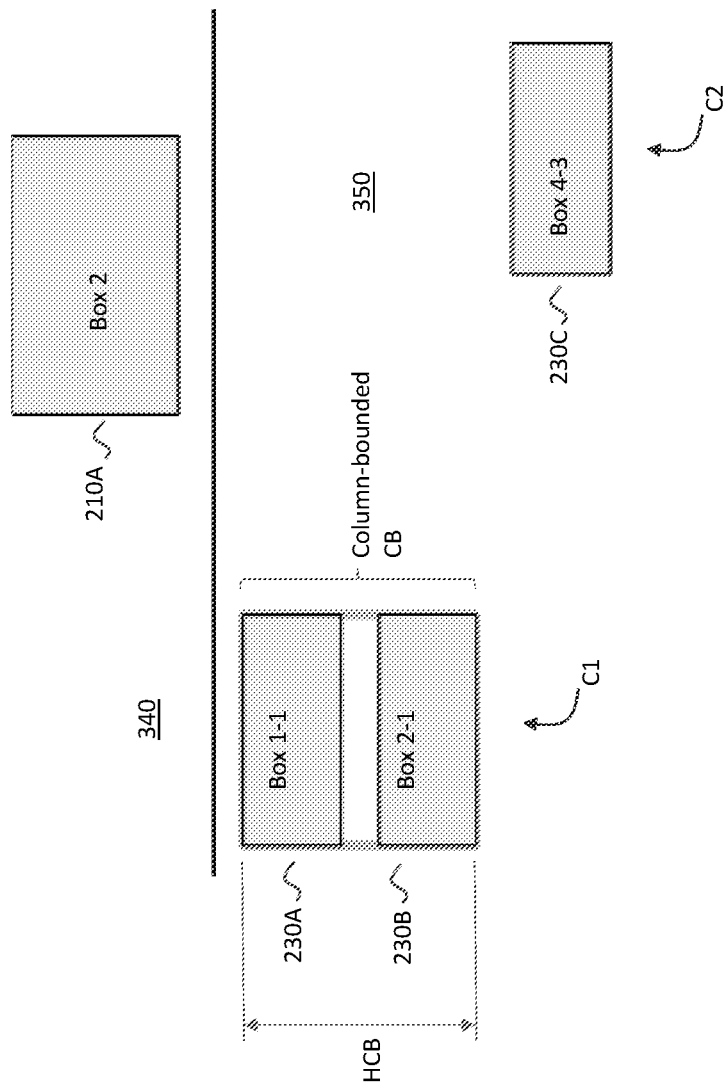
FIG. 5 shows the active set of technical assets in the grid according to another step of the disclosed embodiment, where technical assets, having been station bound and height-wise adjusted, are bound by column (column bounded).

FIG. 5 shows the active set of technical assets in the grid according to another step of the disclosed embodiment, where technical assets, having been station bound and height-wise adjusted, are bound by column (column bounded). As shown in FIG. 5, the method includes determining when any one of the columns C1, C2 of the system grid 180 in the second display band 350 includes two or more of the sets of bounded asset boxes (e.g., station-bounded). Thereafter the method includes the system grouping the two or more of the sets of bounded asset boxes as column-bounded asset boxes. For example, box 1-1 and box 2-1 are identified as a column-bounded asset box CB. The column-bounded asset box CB has a combined height-wise HCB span of each of the sets of bounded asset boxes therein in their then existing positions in the system grid 180.

Figure 6:
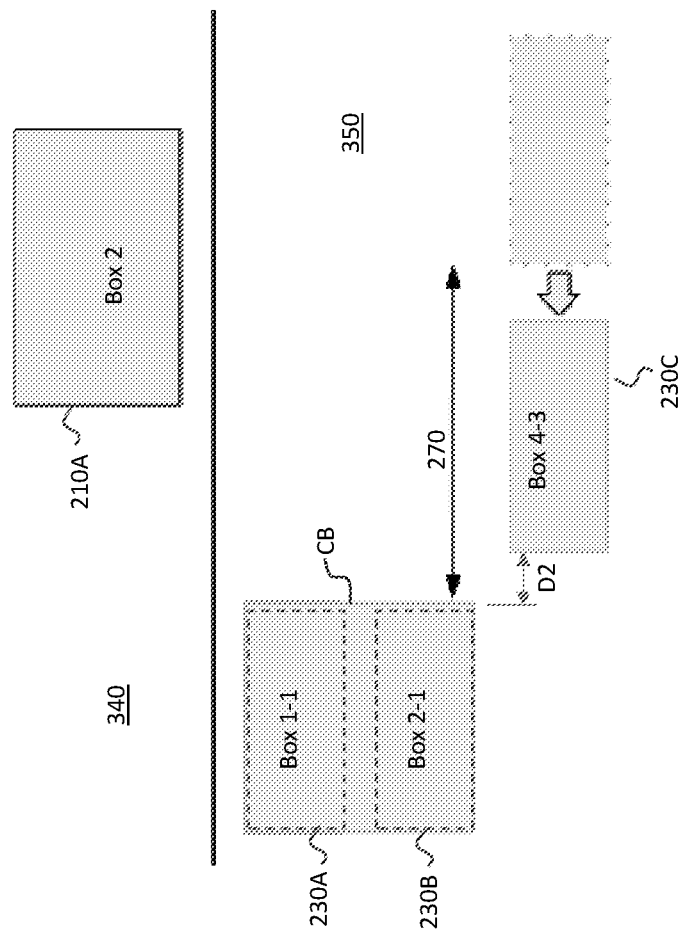
FIG. 6 shows the active set of technical assets in the grid according to another step of the disclosed embodiment, where technical assets, having been station and column bounded, are transversely adjusted.

FIG. 6 shows the active set of technical assets in the grid according to another step of the disclosed embodiment, where technical assets, having been station and column bounded, are transversely adjusted. Turning to FIG. 6, The method includes the system organizing the sets of bounded asset boxes (station and column bounded, if any) in the second display band so that transversely (widthwise) adjacent ones of the sets of bounded asset boxes in the second display band 350 are within the predetermined distance D2 of each other. Thereafter box 1-1 and box 2-1 may be ungrouped from each other (e.g., the column-bounding is ended).

Figure 7:
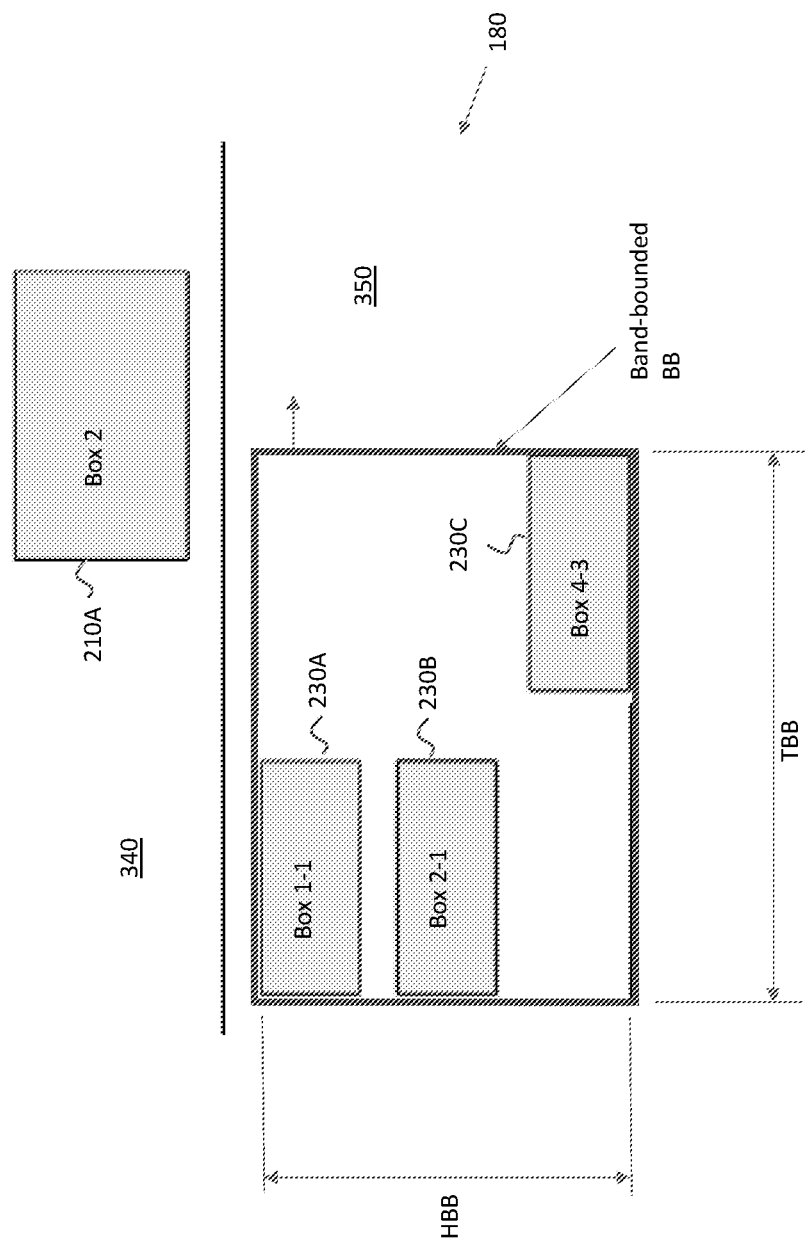
FIG. 7 shows the active set of technical assets in the grid according to another step of the disclosed embodiment, where technical assets, having been station bounded, are bounded by band (band-bounded).

FIG. 7 shows the active set of technical assets in the grid according to another step of the disclosed embodiment, where technical assets, having been station bounded, are bounded by band (band-bounded). Turning to FIG. 7, the method includes the system grouping all of the sets of bounded asset boxes in the second display band 350 as a band-bounded asset box BB. The band-bounded asset box BB has a combined height-wise HBB and transverse span TBB of each of the sets of bounded asset boxes therein in their then existing positions in the system grid 180. The band bounded assets in the second band and the assets in the first band are then transversely moved so that they are centered on the system grid 180.

Figure 8:
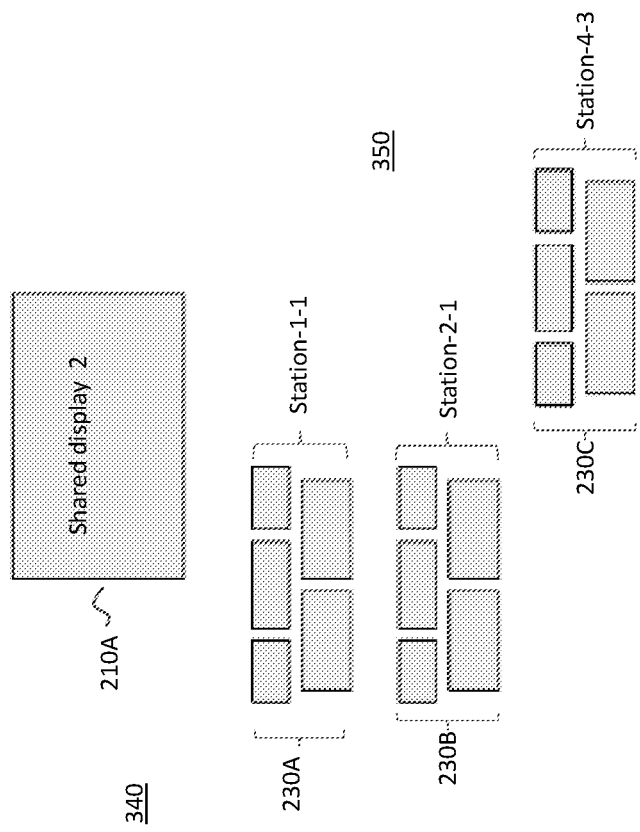
FIG. 8 shows the active set of technical assets in the grid according to another step of the disclosed embodiment, where technical assets are shown as manipulated via the method.

FIG. 8 shows the active set of technical assets in the grid according to another step of the disclosed embodiment, where technical assets are shown as manipulated via the method. Turning to FIG. 8, the method includes the system scaling the first and second display bands so that the asset boxes therein, including as band bounded in the second band 350, fit (e.g., proportionally) the available space within the respective display bands. The method further includes graphically rendering the asset boxes to appear scaled, ungrouped, unbounded, and in their optimized locations.

Turning to FIGS. 9-15, another schematic representation of a method is disclosed of updating a graphical rendering 80, in a system display 90 by a system controller 100, of technology assets 105 operationally connected to the system controller 100. Specifically, as indicated, these figures show the process of grouping the station assets so as to create the station-bounded boxes illustrated in FIG. 2. The result of this process is utilized for optimizing the rendering of the stations 230 shown in FIGS. 1-8.

Figure 9:
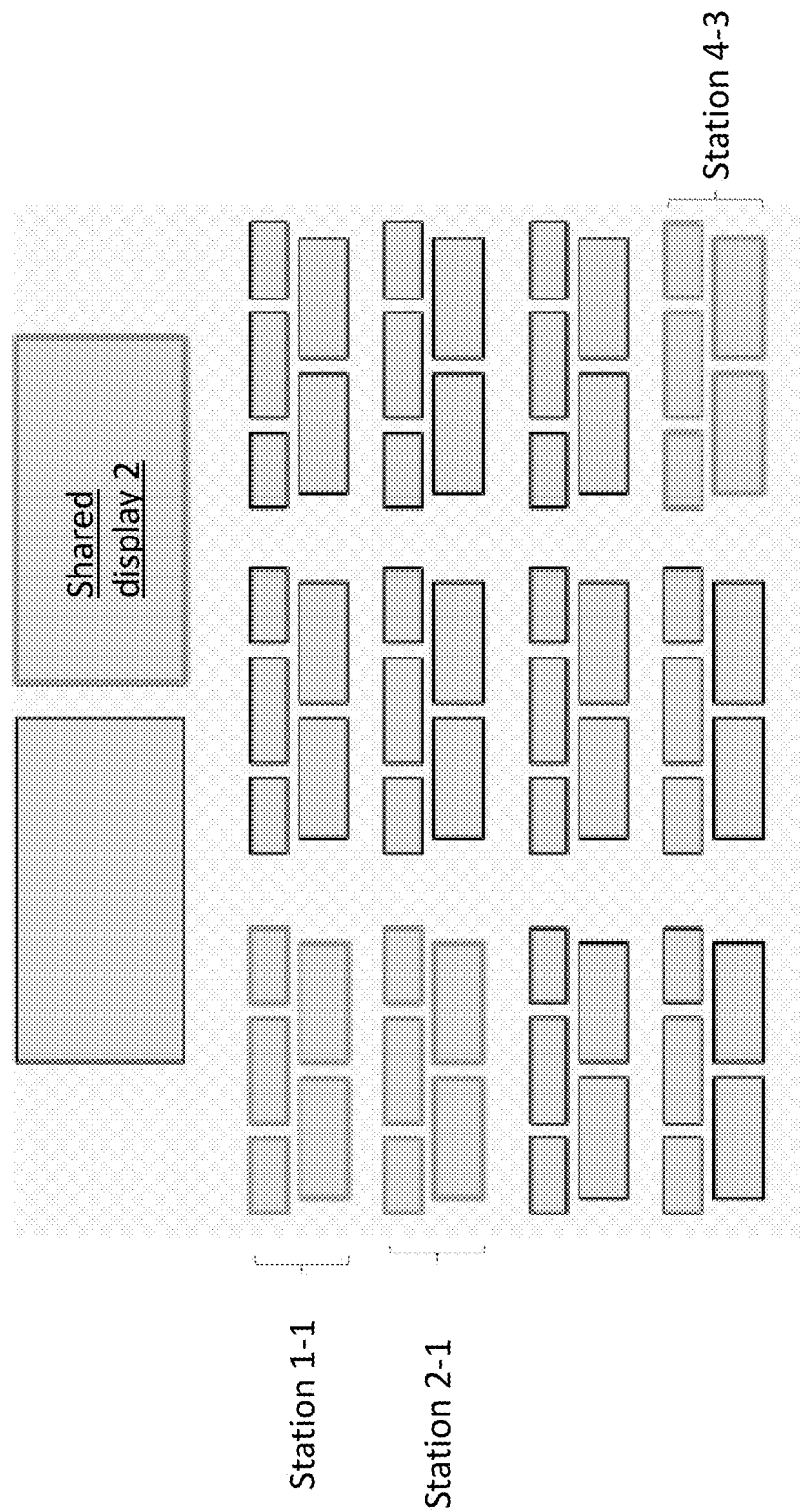
FIG. 9 shows technical features of a switching system and a graphical grid showing technical assets that are controllable by the switching system according to a disclosed embodiment, showing initial steps of station bounding active assets.

FIG. 9 shows technical features of a switching system and a graphical grid showing technical assets that are controllable by the switching system according to a disclosed embodiment, showing initial steps of station bounding active assets. As shown in FIG. 9, this figure shows the system of FIG. 1. As indicated above, the system, via the system controller 100, receives instructions indicating that ones of the technology assets 105 are selected as active for a computing session.

Figure 10:
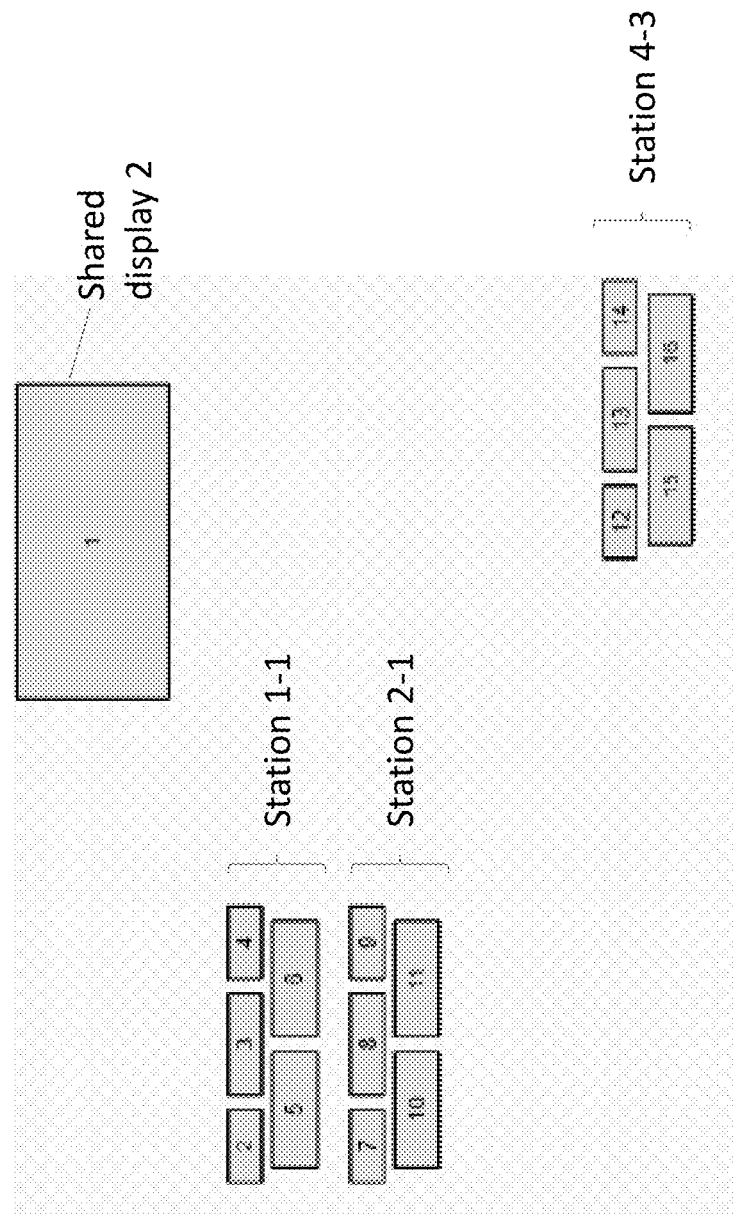
FIG. 10 shows the active set of technical assets in the grid according to another step of the disclosed embodiment, where the active technical assets are sequentially numbered.

FIG. 10 shows the active set of technical assets in the grid according to another step of the disclosed embodiment, where the active technical assets are sequentially numbered. As shown in FIG. 10, the method includes the system removing from the graphical rendering 80 the technology assets 105 that are not selected. The system then identifies all assets sequentially, starting with the topmost asset, i.e., the shared display 2. For example, the assets are illustrated as being numbered 1-16 across shared display 2, station 1-1, station 2-1 and station 4-3.

Figure 11:
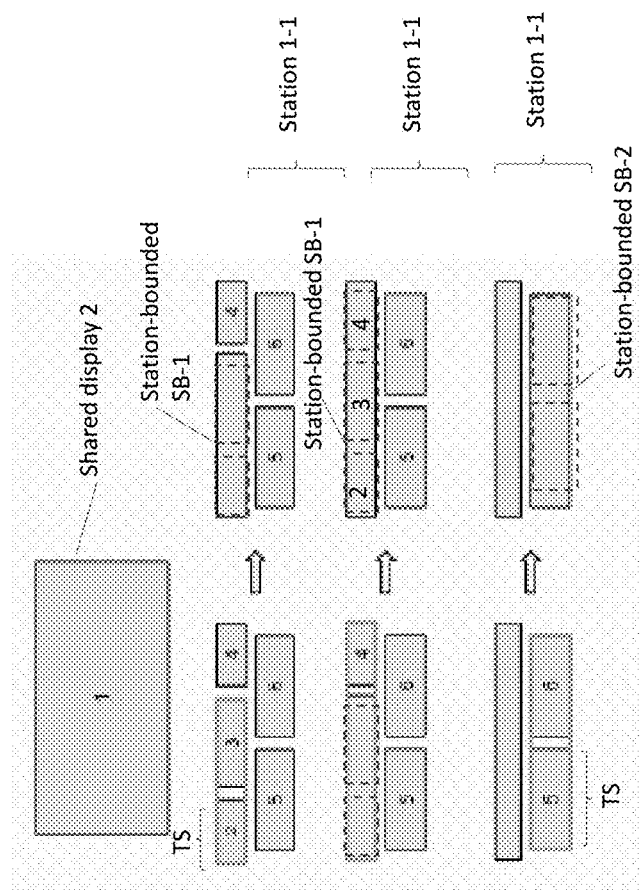
FIGS. 11 and 12 show the active set of technical assets in the grid according to another step of the disclosed embodiment, where the transversely adjacent and active technical assets are grouped.
Figure 12:
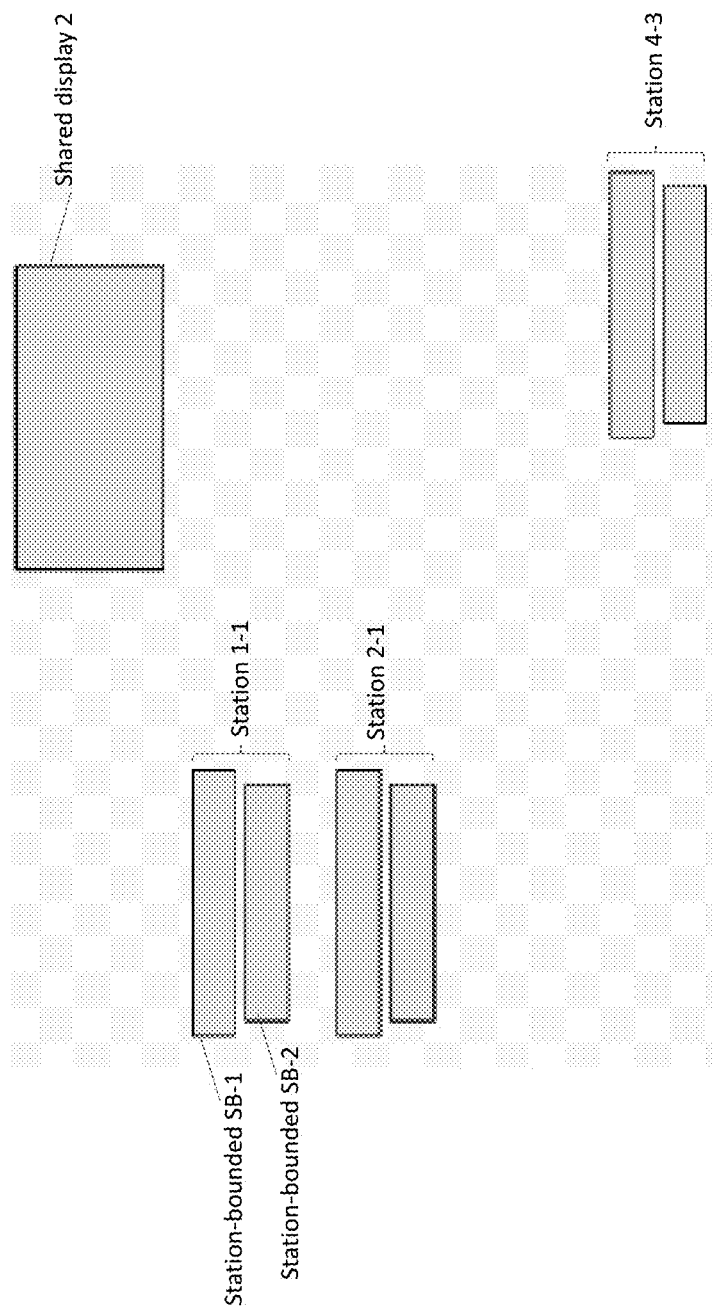

FIGS. 11 and 12 show the active set of technical assets in the grid according to another step of the disclosed embodiment, where the transversely adjacent and active technical assets are grouped. As shown in FIG. 11, the system, starting with asset number 1, determines whether there is a transversely adjacent asset in the same row. If there is one, the system then determines if the transverse spacing is less than 50% of the transverse size TS of the smaller of the two respective asset boxes. If this condition is satisfied, then the system groups the two assets as part of the same station. In one embodiment, when making the determination identified herein, the system determines if the transverse spacing is less than 50% of the transverse size TS relative to the smallest asset in the field of assets in the second display band rather than the adjacent asset. The ratio identified herein is not intended in limiting the scope of the disclosure.

For example, there is no transversely adjacent asset to asset number 1 (the shared display) in its row. Thus, the system compares the spacing and sizing between assets 2 and 3. The transverse spacing between the two is less than 50% of the transverse size TS of the smaller of the two respective asset boxes. Thus, the system groups assets 2 and 3 as part of the same station. These assets are now station-bounded and replace with a station-bounded row box SB-1 as shown in the figure. This process continues with a comparison of the station-bounded row box SB-1 with box 4 to group these boxes into box SB-1. Station-bounded row box SB-1 now includes asset boxes 2, 3 and 4.

No other boxes are transversely close enough to station-bounded row box SB-1. Thus, the system compares the transverse spacing of assets 5 and 6 and determines that the transverse space is less than 50% of the transverse size TS of the smaller of the two respective asset boxes. The system groups these boxes as a new box SB-2. This same process is carried out for all assets in the grid until the assets at each station, i.e., station 1-1, station 2-1 and station 4-3, include respective station-bounded row boxes, shown in FIG. 12.

Figure 13:
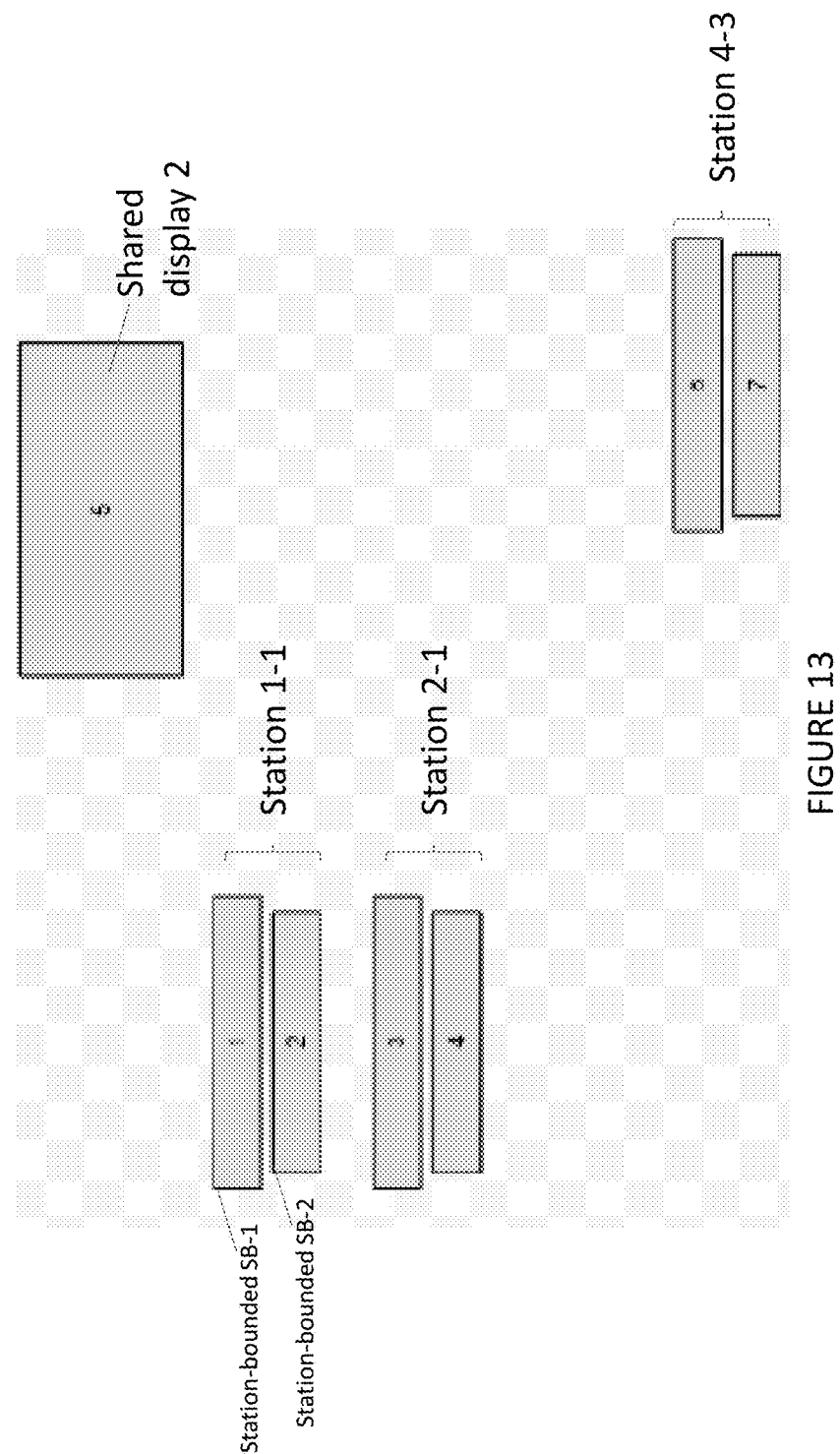
FIG. 13 shows the active set of technical assets in the grid according to another step of the disclosed embodiment, where the transversely grouped assets are renumbered.

FIG. 13 shows the active set of technical assets in the grid according to another step of the disclosed embodiment, where the transversely grouped assets are renumbered. As shown in FIG. 13 the system, starting with the leftmost asset box, consecutively numbers the boxes, including the station-bounded row boxes and the box 2 for the shared display. For example, the asset boxes are illustrated as being numbered 1-7 across station 1-1, station 2-1, shared display 2, and station 4-3.

Figure 14:
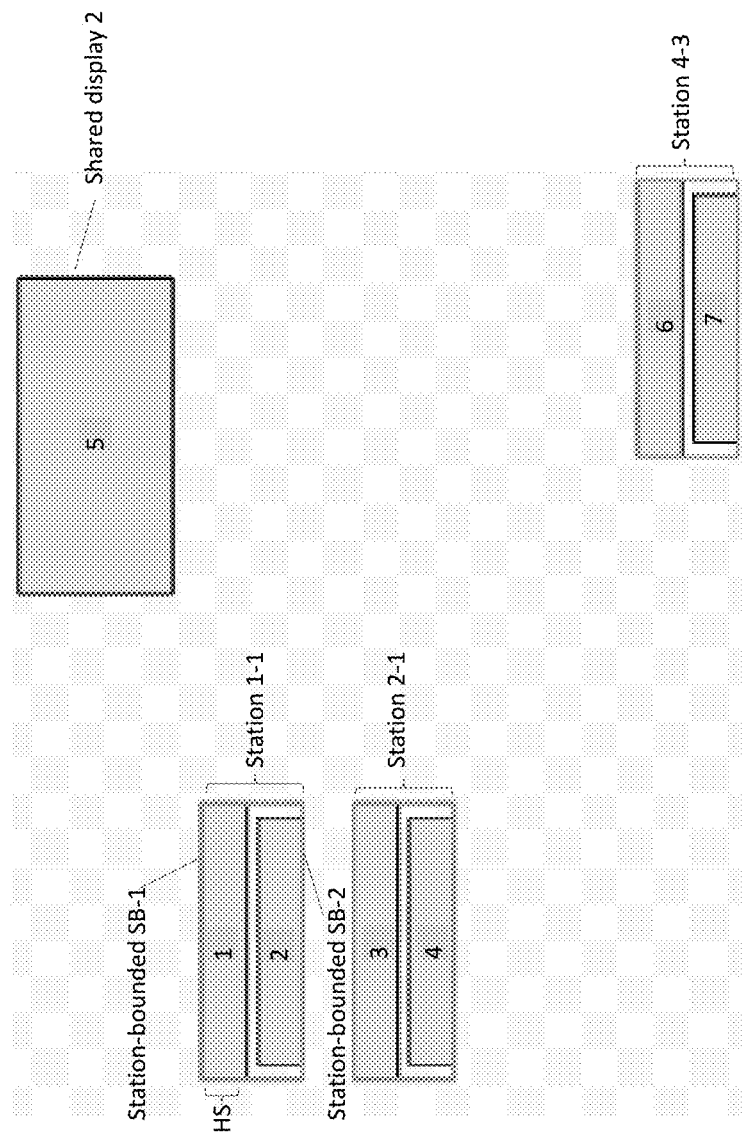
FIGS. 14 and 15 show the active set of technical assets in the grid according to another step of the disclosed embodiment, where the height-wise adjacent and transversely grouped assets are height-wise grouped.
Figure 15:
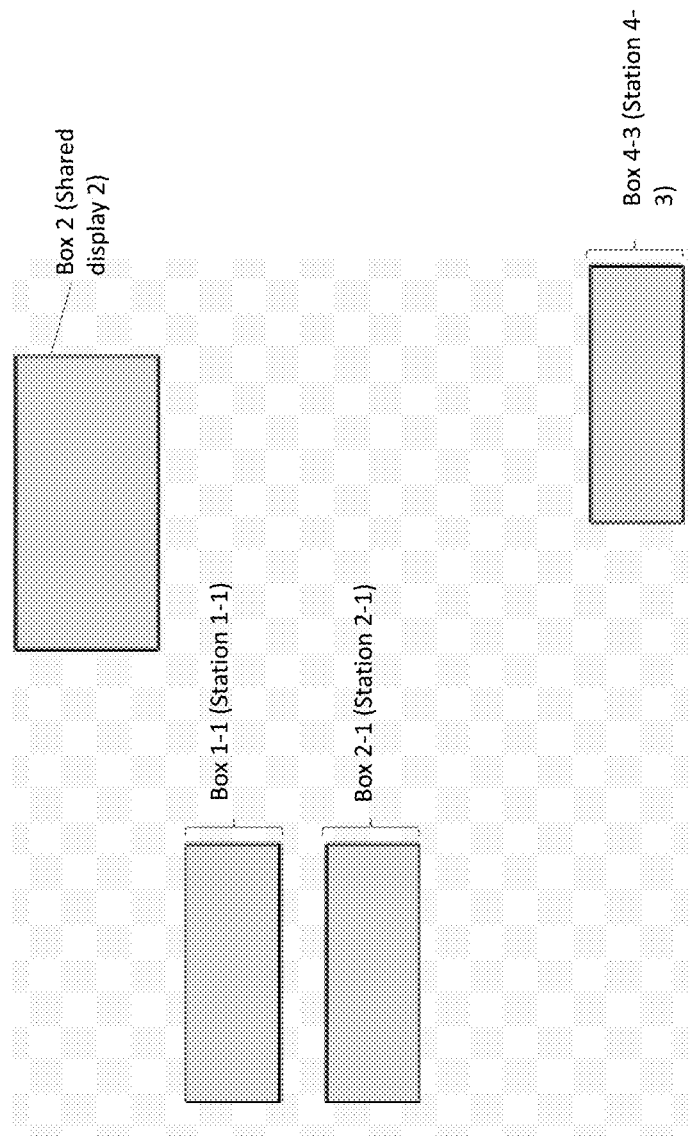

FIGS. 14 and 15 show the active set of technical assets in the grid according to another step of the disclosed embodiment, where the height-wise adjacent and transversely grouped assets are height-wise grouped. As shown in FIG. 14, generally, starting with asset number 1, the system determines whether there is a height-wise adjacent asset box in the same column. If there is one, the system then determines If the height-wise space is less than 50% of the height-wise size HS of the smaller of the two respective asset boxes. If this condition is satisfied, then the system groups the two assets as being part of the same station. The ratio identified herein is not intended in limiting the scope of the disclosure. For example, the system compares the spacing and sizing between assets 1 and 2, corresponding to station-mounted row boxes SB-1 and SB-2. The height-wise spacing between the two is less than 50% of the height-wise size HS of the smaller of the two respective asset boxes. Thus, the system groups assets boxes 1 and 2 as being part of the same station. These assets are now station-bounded and replace with station-bounded box 1-1 as shown in the figure. Box 3 is too far from box 1-1 to be part of the same station. However, box 3 and box 4 are close enough for the system to group them as box 2-1, e.g., representing bounded assets for station 2-1. This process continues until the assets at station 4-3 are grouped to form box 4-3. As can be appreciated, no assets are close enough to the shared display 2 for the system to group it. The illustration in FIG. 15 shows the resulting configuration of station-bounded assets, which is the same as FIG. 2.

Each of the above methods may be stored as program code on computer readable memory as indicated below. A computer program product would therefore be defined by the computer readable memory having the computer readable program code thereon configured for implementing the methods.

Any wireless connections identified above may apply protocols that include local area network (LAN, or WLAN for wireless LAN) protocols. LAN protocols include WiFi technology, based on the Section 802.11 standards from the Institute of Electrical and Electronics Engineers (IEEE). Other applicable protocols include Low Power WAN (LP-WAN), which is a wireless wide area network (WAN) designed to allow long-range communications at a low bit rates, to enable end devices to operate for extended periods of time (years) using battery power. Long Range WAN (LoRaWAN) is one type of LPWAN maintained by the LoRa Alliance, and is a media access control (MAC) layer protocol for transferring management and application messages between a network server and application server, respectively. LAN and WAN protocols may be generally considered TCP/IP protocols (transmission control protocol/Internet protocol), used to govern the connection of computer systems to the Internet. Wireless connections may also apply protocols that include private area network (PAN) protocols. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the IEEE, representing a suite of high-level communication protocols used to create personal area networks with small, low-power digital radios for low-power low-bandwidth needs. Such protocols also include Z-Wave, which is a wireless communications protocol supported by the Z-Wave Alliance that uses a mesh network, applying low-energy radio waves to communicate between devices such as appliances, allowing for wireless control of the same.

Wireless connections identified above may also include radio-frequency identification (RFID) technology, used for communicating with an integrated chip (IC), e.g., on an RFID smartcard. In addition, Sub-1 Ghz RF equipment operates in the ISM (industrial, scientific and medical) spectrum bands below Sub 1 Ghz—typically in the 769-935 MHz, 315 Mhz and the 468 Mhz frequency range. This spectrum band below 1 Ghz is particularly useful for RF IOT (internet of things) applications. The Internet of things (IoT) describes the network of physical objects—"things"—that are embedded with sensors, software, and other technologies for the purpose of connecting and exchanging data with other devices and systems over the Internet. Other LPWAN-IOT technologies include narrowband internet of things (NB-IOT) and Category M1 internet of things (Cat M1-IOT). Wireless communications for the disclosed systems may include cellular, e.g. 2G/3G/4G (etc.). Other wireless platforms based on RFID technologies include Near-Field-Communication (NFC), which is a set of communication protocols for low-speed communications, e.g., to exchange date between electronic devices over a short distance. NFC standards are defined by the ISO/IEC (defined below), the NFC Forum and the GSMA (Global System for Mobile Communications) group. The above is not intended on limiting the scope of applicable wireless technologies.

Wired connections may include connections (cables/interfaces) under RS (recommended standard)-422, also known as the TIA/EIA-422, which is a technical standard supported by the Telecommunications Industry Association (TIA) and which originated by the Electronic Industries Alliance (EIA) that specifies electrical characteristics of a digital signaling circuit. Wired connections may also include (cables/interfaces) under the RS-232 standard for serial communication transmission of data, which formally defines signals connecting between a DTE (data terminal equipment) such as a computer terminal, and a DCE (data circuit-terminating equipment or data communication equipment), such as a modem. Wired connections may also include connections (cables/interfaces) under the Modbus serial communications protocol, managed by the Modbus Organization. Modbus is a master/slave protocol designed for use with its programmable logic controllers (PLCs) and which is a commonly available means of connecting industrial electronic devices. Wireless connections may also include connectors (cables/interfaces) under the PROFibus (Process Field Bus) standard managed by PROFIBUS & PROFINET International (PI). PROFibus which is a standard for fieldbus communication in automation technology, openly published as part of IEC (International Electrotechnical Commission) 61158. Wired communications may also be over a Controller Area Network (CAN) bus. A CAN is a vehicle bus standard that allow microcontrollers and devices to communicate with each other in applications without a host computer. CAN is a message-based protocol released by the International Organization for Standards (ISO). The above is not intended on limiting the scope of applicable wired technologies.

When data is transmitted over a network between end processors as identified herein, the data may be transmitted in raw form or may be processed in whole or part at any one of the end processors or an intermediate processor, e.g., at a cloud service (e.g. where at least a portion of the transmission path is wireless) or other processor. The data may be parsed at any one of the processors, partially or completely processed or complied, and may then be stitched together or maintained as separate packets of information. Each processor or controller identified herein may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory identified herein may be but is not limited to a random access memory (RAM), read only memory (ROM), or other electronic, optical, magnetic or any other computer readable medium. Embodiments can be in the form of processor-implemented processes and devices for practicing those processes, such as processor.

Figure 16:
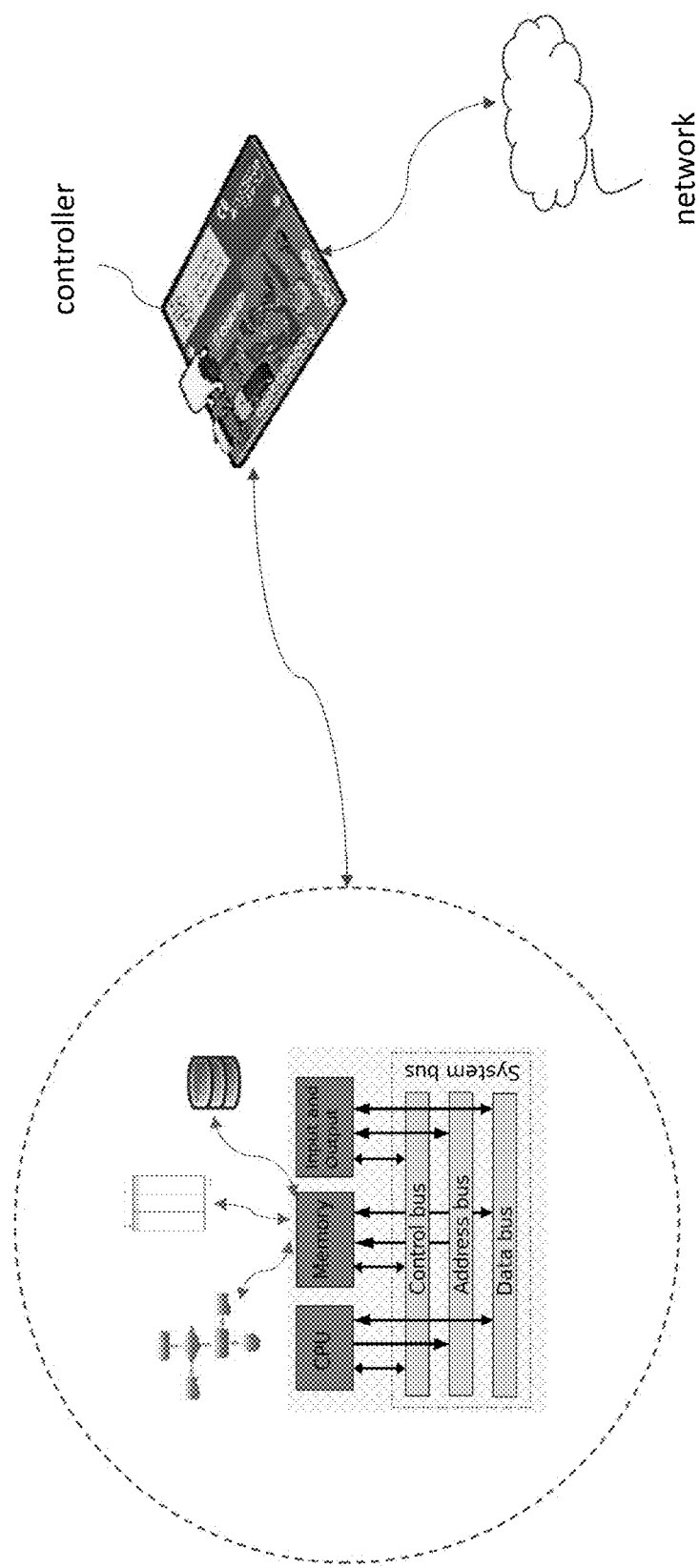
FIG. 16 illustrates features of a processing system, communicating via a network, according to an embodiment.

As shown in FIG. 16, as indicated, the controller may further include, in addition to a processor and non-volatile memory (or computer readable medium), one or more input and/or output (I/O) device interface(s) that are communicatively coupled via an onboard (local) interface to communicate among other devices. The onboard interface may include, for example but not limited to, an onboard system bus, including a control bus (for inter-device communications), an address bus (for physical addressing) and a data bus (for transferring data). That is, the system bus may enable the electronic communications between the processor, memory and I/O connections. The I/O connections may also include wired connections and/or wireless connections identified herein. The onboard interface may have additional elements, which are omitted for simplicity, such as controllers, buffers (caches), drivers, repeaters, and receivers to enable electronic communications. The memory may execute programs, access data, or lookup charts, or a combination of each, in furtherance of its processing, all of which may be stored in advance or received during execution of its processes by other computing devices, e.g., via a cloud service or other network connection identified herein with other processors.

Embodiments can also be in the form of computer code based modules, e.g., computer program code (e.g., computer program product) containing instructions embodied in tangible media (e.g., non-transitory computer readable medium), such as floppy diskettes, CD ROMs, hard drives, on processor registers as firmware, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of updating a graphical rendering, in a system display by a system controller, of technology assets operationally connected to the system controller,
   wherein the technology assets are rendered as asset boxes and distributed along a system grid that includes:
   a first grid at the top or bottom of the system grid in a height-wise direction that includes shared displays; and
   a second grid that is adjacent to the first grid in the height-wise direction and includes stations that respectively include station assets including station displays and peripheral assets,
   wherein the first grid is a row-grid extending in a transverse direction and the second grid is a rectangular-grid including rows extending in the transverse direction and columns extending in the height-wise direction; and
   the method comprising:
   receiving instructions indicating that ones of the technology assets are selected as active for a computing session;
   removing from the graphical rendering the technology assets that are not selected,
   wherein, for the selected technology assets, the method further includes:
   grouping the assets at the respective stations as station-bounded asset boxes, wherein the station-bounded asset boxes have a combined height-wise and transverse span of each of the asset boxes therein in their then existing positions in the system grid;
   determining that the first grid includes shared displays and that that remaining assets in the system grid are station assets;
   defining first and second display bands along the system display, wherein the first display band is height-wise above the second display band, and wherein the first grid is located in the first display band and the second grid is located in the second display band; and
   determining when any one of the rows of the system grid includes two or more of the sets of bounded asset boxes, and grouping the two or more of the sets of bounded asset boxes as row-bounded asset boxes;
   organizing the sets of bounded asset boxes in the second display band so that height-wise adjacent ones of the sets of bounded asset boxes in the second display band are within a predetermined distance of each other;
   determining when any one of the columns of the system grid in the second display band includes two or more of the sets of bounded asset boxes, and grouping the two or more of the sets of bounded asset boxes as column-bounded asset boxes;
   organizing the sets of bounded asset boxes in the second display band so that transversely adjacent ones of the sets of bounded asset boxes in the second display band are within the predetermined distance of each other;
   grouping the sets of bounded asset boxes in the second display band as a band-bounded asset box, wherein the band-bounded asset box has a combined height-wise and transverse span of each of the sets of bounded asset boxes therein in their then existing positions in the system grid;

transversely centering the band bounded assets in the second band and the assets in the first band;

scaling the first and second display bands so that the sets of bounded asset boxes therein fit the available space within the respective display bands; and rendering the asset boxes as centered and scaled.

2. A method of updating a graphical rendering, in a system display by a system controller, of technology assets operationally connected to the system controller, wherein the technology assets are rendered as asset boxes and distributed along a system grid that includes:

a first grid at the top or bottom of the system grid in a height-wise direction that includes shared displays; and a second grid that is adjacent to the first grid in the height-wise direction and includes stations that respectively include station assets including station displays and peripheral assets, wherein the first grid is a row-grid extending in a transverse direction and the second grid is a rectangular-grid including rows extending in the transverse direction and columns extending in the height-wise direction; and the method comprising:

receiving instructions indicating that ones of the technology assets are selected as active for a computing session;

removing from the graphical rendering the technology assets that are not selected, wherein, for the selected technology assets, the method further includes:

determining when two or more transversely adjacent ones of the asset boxes are successively spaced apart from each other by a distance that is less than a threshold;

grouping the two or more of the asset boxes as transverse-bounded asset boxes;

determining when two or more height-wise adjacent ones of the asset boxes are successively spaced apart from each other by a distance that is less than the threshold; and grouping the two or more of the asset boxes as height-wise bounded asset boxes, thereby grouping, from the assets at the stations, station-bounded asset boxes.

3. A computer program product comprising a non-transitory computer readable medium having computer readable program code configured for implementing the method of claim 1.

4. A computer program product comprising a non-transitory computer readable medium having computer readable program code configured for implementing the method of claim 2.

* * * * *